June 16, 1925.

B. H. ANIBAL

DOOR

Filed June 4, 1923

1,542,595

INVENTOR.
B. H. Anibal
BY Edward N. Pagelsen
ATTORNEY.

Patented June 16, 1925.

1,542,595

UNITED STATES PATENT OFFICE.

BENJAMIN H. ANIBAL, OF CLEVELAND, OHIO.

DOOR.

Application filed June 4, 1923. Serial No. 643,291.

*To all whom it may concern:*

Be it known that I, BENJAMIN H. ANIBAL, a citizen of the United States, and residing at Cleveland, in the county of Cuyahoga and State of Ohio, have invented a new and Improved Door, of which the following is a specification.

This invention relates to the construction of the doors of motor vehicles, particularly to the doors of coupes and the front doors of limousines and sedans, and its object is to provide a door of this character which shall have a transparent upper portion with an inclined side edge and a vertically slidable transparent panel which shall have its upright edges supported throughout their length in the usual manner.

A further object of this invention is to provide a vehicle door adapted to fit against a rearwardly inclined windshield side frame and be provided with a vertically movable transparent panel.

A further object of this invention is to provide a door whose upper portion consists of two transparent panels, one of which is vertically movable and has its upright edges fully supported.

Figure 1:
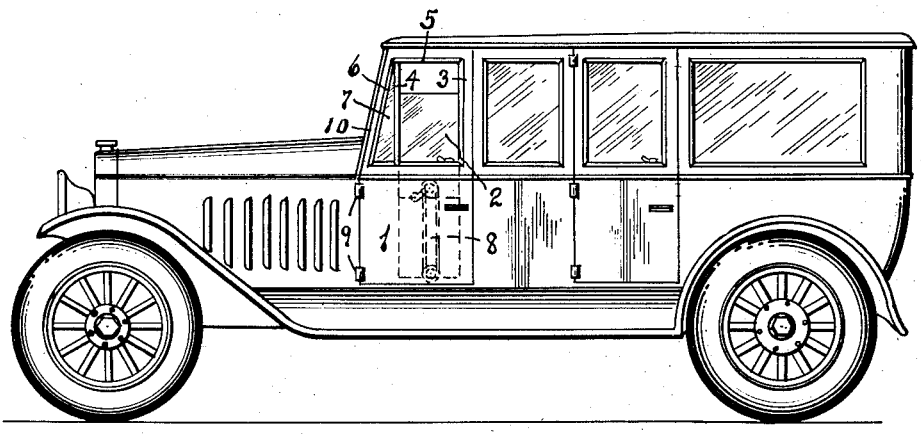
Figure 2:
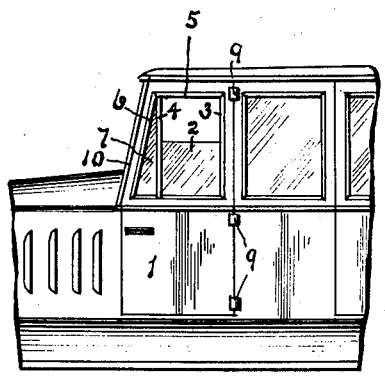

In the accompanying drawing, Fig. 1 is a side elevation of a motor vehicle equipped with this improved door. Fig. 2 is a side elevation of a portion of a motor vehicle showing the door hinged along its rear edge.

Similar reference characters refer to like parts throughout the several views.

Automobile body designers have attempted to embody rearwardly sloping windshields and frames therefor in closed as well as open bodies, but the result has usually been unsatisfactory because the front edges of the doors of coupes and of the front doors of the larger closed bodies could not be in front or ahead of the vertical lines of the tops of such inclined windshield frames, the space between the front edges of the seats and the front edges of the door openings being therefore undesirably restricted. Where such doors have been formed with inclined front edges, the glass panels had to be stationary as a movable panel with inclined edges could not be employed as the major portion thereof would be supported only along its rear edge.

The door shown in Fig. 1 has the usual lower portion 1 provided with metal or wood inner and outer surfaces properly separated to receive the mechanism for raising the panel 2 of glass which is slidable between the uprights 3 and 4. A cross bar 5 connects the upper ends of these guides and from the forward end of the cross bar an inclined member 6 extends down to the lower portion 1 of the door, forming one of the supports for the triangular glass panel 7. This inclined member fits the frame 10 of the body.

Any desired mechanism for raising and lowering the panel 2 may be employed, that indicated at 8 being merely conventionally shown. The constructions of the door, of the uprights 3, 4 and 6 and of the hinges 9 are not detailed as any desired types may be employed. The widths of the members 3, 4 and 6 will depend upon the design of body construction employed.

Instead of using the hinges 9 at the front edge of the door, they may be mounted at the rear edge as shown in Fig. 2, but the transparent upper portion is again in two parts, of which one can be moved up and down between proper guide bars. When the movable panel is lowered, the triangular panel 7 acts as an auxiliary windshield and reduces the draught at the front of the vehicle body while at the same time permitting as full vision as in bodies having vertical windshield frames. The clearance between the front of the seat and the front of the door opening is the same as in bodies having vertical windshields, while at the same time all the advantages of the inclined windshields are retained.

The details of construction and the proportions of the parts may all be changed by those skilled in the art without departing from the spirit of my invention as set forth in the following claims.

I claim:—

1. A vehicle body having a door opening whose rear side is substantially vertical and the lower part of the forward side is substantially parallel to the rear side and the upper part of the forward side is inclined toward the rear, and a door fitting said opening and comprising a solid lower portion and an upper portion consisting of side and top members, two transparent panels mounted in the upper portion of the door, one of said panels tapering upwardly and the other having parallel side edges, and an upright member between said panels, said upright member and the side member of the door on the opposite side of the panel with parallel edges constituting guides wherein such panel is slidable.

2. A vehicle door having a transparent upper portion consisting of a triangular stationary panel and a movable panel having parallel sides and of parallel upright guides for said movable panel.

BENJAMIN H. ANIBAL.